United States Patent
Thompson Alvey et al.

(10) Patent No.: US 10,155,558 B1
(45) Date of Patent: Dec. 18, 2018

(54) RIDER'S APPAREL ASSEMBLY

(71) Applicants: Bambi Thompson Alvey, Portland, OR (US); Franklin Alvey, Portland, OR (US)

(72) Inventors: Bambi Thompson Alvey, Portland, OR (US); Franklin Alvey, Portland, OR (US)

(*) Notice: Subject to any disclaimer, the term of this patent is extended or adjusted under 35 U.S.C. 154(b) by 0 days.

(21) Appl. No.: 15/624,871

(22) Filed: Jun. 16, 2017

(51) Int. Cl.
*B62J 6/00* (2006.01)
*A41D 3/00* (2006.01)
*A41D 1/00* (2018.01)
*H02S 40/38* (2014.01)

(52) U.S. Cl.
CPC ............. *B62J 6/005* (2013.01); *A41D 1/002* (2013.01); *A41D 3/00* (2013.01); *H02S 40/38* (2014.12); *A41D 2600/102* (2013.01)

(58) Field of Classification Search
None
See application file for complete search history.

(56) References Cited

U.S. PATENT DOCUMENTS

| 6,538,567 | B2 | 3/2003 | Stewart | |
|---|---|---|---|---|
| 6,679,615 | B2* | 1/2004 | Spearing | A41D 13/01 340/475 |
| 6,834,395 | B2 | 12/2004 | Fuentes | |
| 7,455,139 | B2 | 11/2008 | Lee | |
| D624,247 | S | 9/2010 | Thind | |
| 8,009,031 | B2 | 8/2011 | Pacheco et al. | |
| 2009/0102627 | A1* | 4/2009 | Russell | B62J 6/005 340/432 |
| 2010/0251453 | A1* | 10/2010 | Chen | B60Q 1/2673 2/69 |
| 2010/0253501 | A1* | 10/2010 | Gibson | A41D 13/01 340/475 |
| 2014/0085870 | A1 | 3/2014 | Abas | |
| 2016/0068214 | A1* | 3/2016 | Tang | B62J 6/00 362/108 |

FOREIGN PATENT DOCUMENTS

WO WO20047105523 12/2004

* cited by examiner

*Primary Examiner* — Brent Swarthout

(57) ABSTRACT

A rider's apparel assembly for indicating turns includes a jacket that is configured to position over a torso and arms of a user. A power module and a plurality of first lights are coupled to the jacket. The first lights are positioned on and distributed between sleeves of the jacket. Each of a pair of controllers is positioned below an end of a respective sleeve proximate to a respective hand of the user. The controller is coupled to the power module and the first lights that are positioned on the respective sleeve. The controller is positioned to selectively couple the first lights to the power module to indicate the user's intent to execute a turn corresponding to the respective sleeve. A second light is reversibly couplable to the jacket and is operationally couplable to the power module. The second light is configured to render the user visible to others.

9 Claims, 4 Drawing Sheets

RIDER'S APPAREL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to apparel assemblies and more particularly pertains to a new apparel assembly for indicating turns.

BRIEF SUMMARY OF THE INVENTION

An embodiment of the disclosure meets the needs presented above by generally comprising a jacket that is configured to position over a torso and arms of a user. A power module and a plurality of first lights are coupled to the jacket. The first lights are positioned on and distributed between sleeves of the jacket. Each of a pair of controllers is positioned below an end of a respective sleeve proximate to a respective hand of the user. The controller is coupled to the power module and the first lights that are positioned on the respective sleeve. The controller is positioned to selectively couple the first lights to the power module to indicate the user's intent to execute a turn corresponding to the respective sleeve. A second light is reversibly couplable to the jacket and is operationally couplable to the power module. The second light is configured to render the user visible to others.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
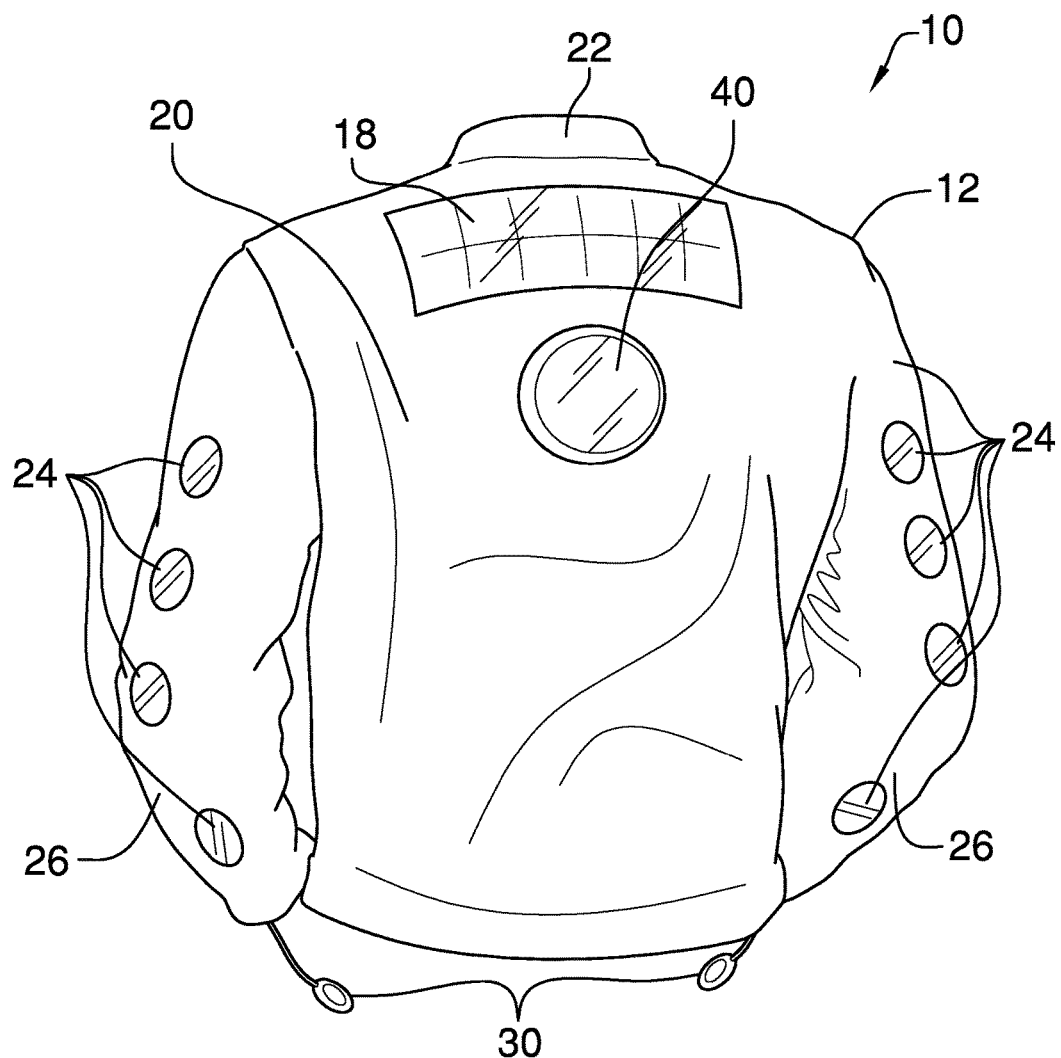
FIG. 1 is an isometric perspective view of a rider's apparel assembly according to an embodiment of the disclosure.
Figure 2:
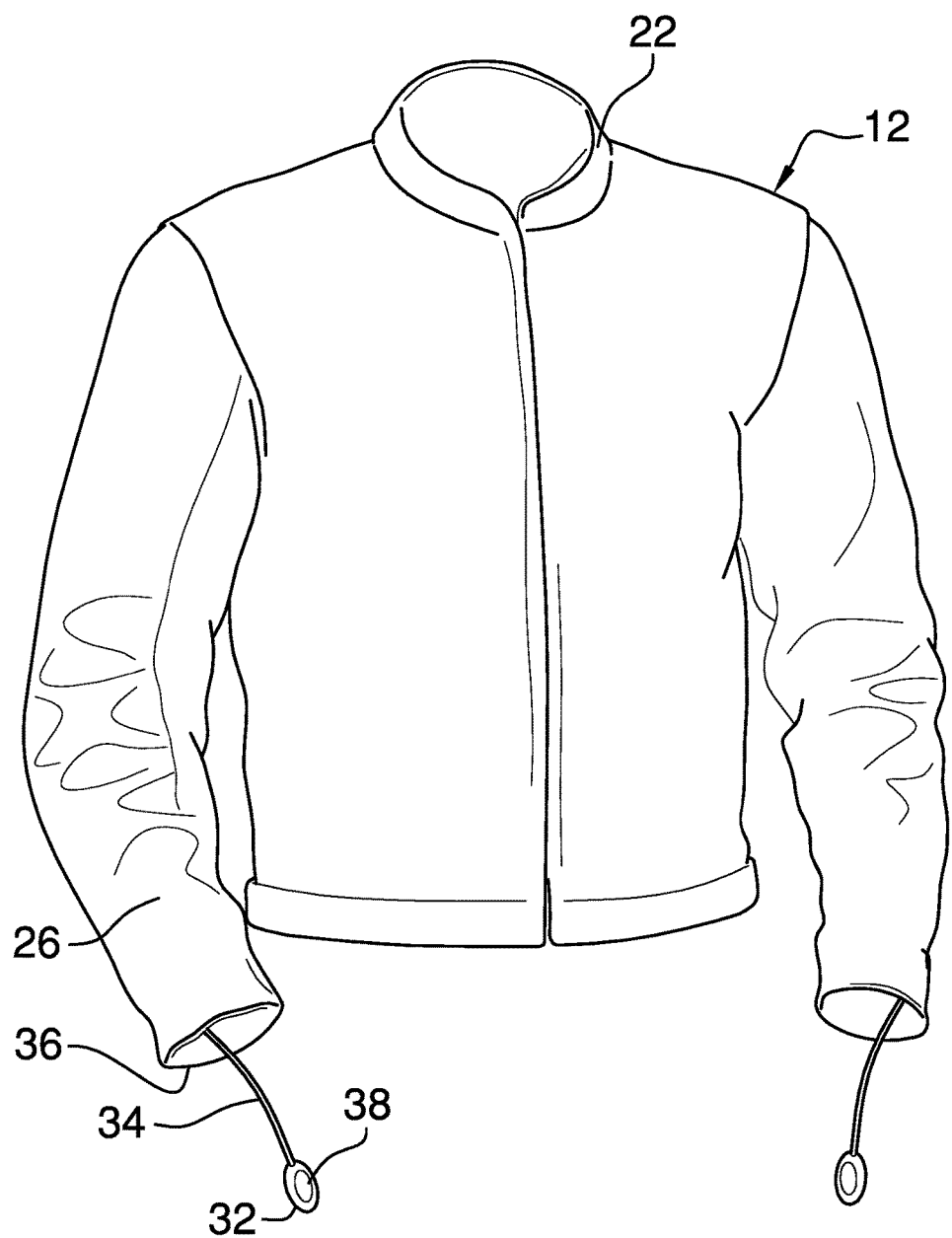
FIG. 2 is a front view of an embodiment of the disclosure.
Figure 3:
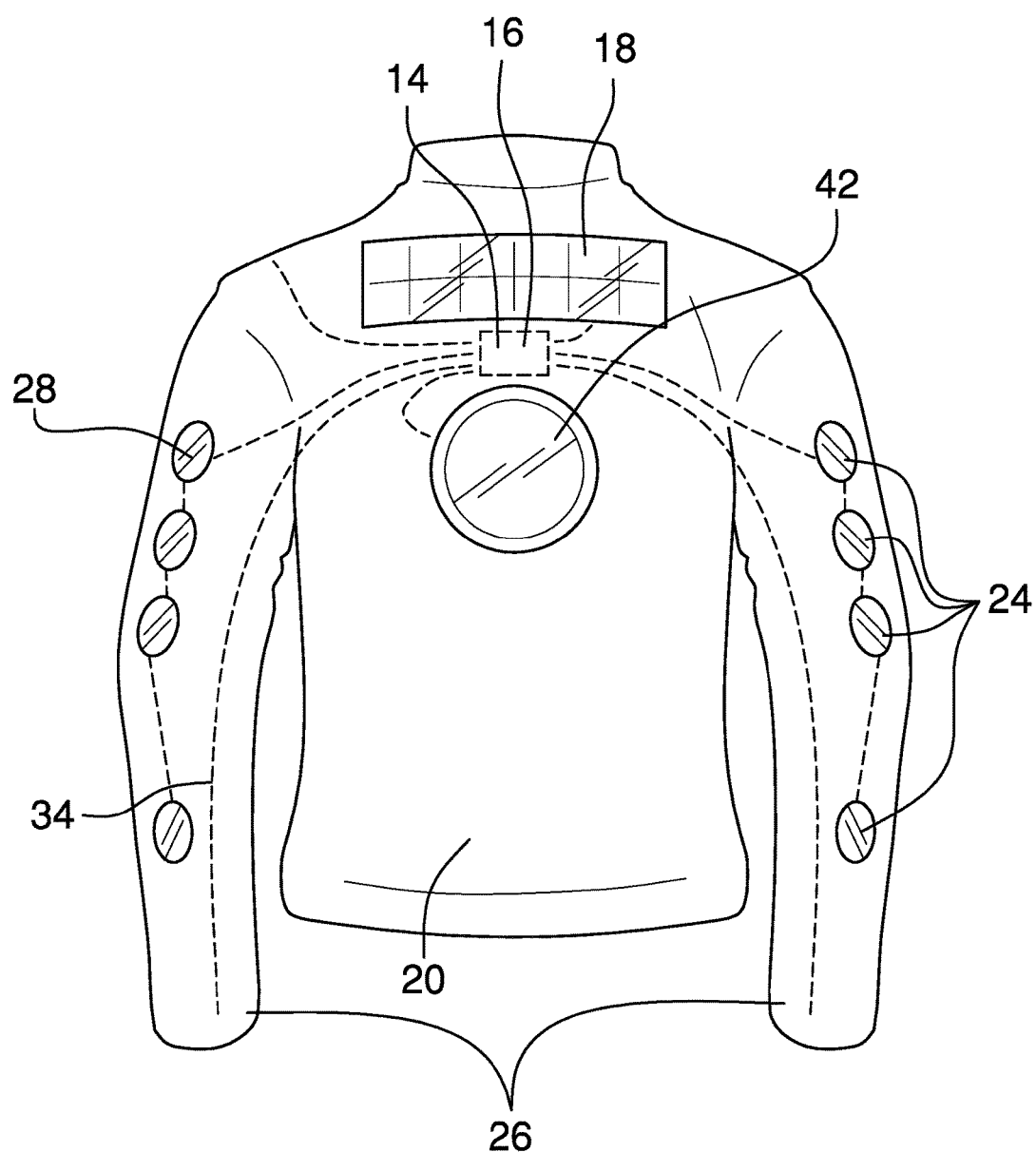
FIG. 3 is a back view of an embodiment of the disclosure.
Figure 4:
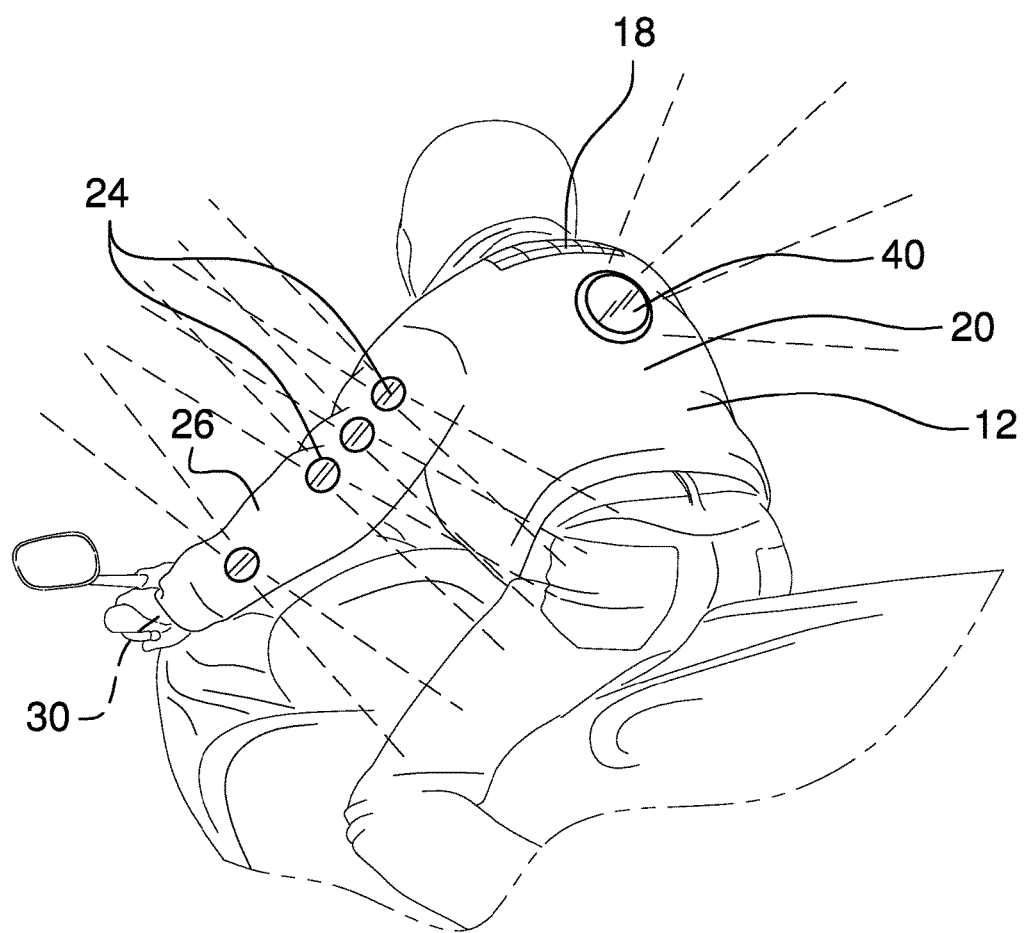
FIG. 4 is an in-use view of an embodiment of the disclosure.

With reference now to the drawings, and in particular to FIGS. 1 through 4 thereof, a new apparel assembly embodying the principles and concepts of an embodiment of the disclosure and generally designated by the reference numeral 10 will be described.

As best illustrated in FIGS. 1 through 4, the rider's apparel assembly 10 generally comprises a jacket 12 that is configured to position over a torso and arms of a user so that the jacket 12 is coupled to the user. A power module 14 is coupled to the jacket 12. In one embodiment, the power module 14 comprises at least one battery 16. In another embodiment, the at least one battery 16 is rechargeable. In another embodiment, the jacket 12 comprises porous fabric so that the jacket 12 is air permeable.

A solar panel 18 is coupled to the jacket 12. The solar panel 18 is operationally coupled to the at least one battery 16. The solar panel 18 is configured to absorb solar radiation to generate an electrical current to recharge the at least one battery 16. In one embodiment, the solar panel 18 is positioned on a back 20 of the jacket 12 proximate to a collar 22 of the jacket 12.

A plurality of first lights 24 is coupled to the jacket 12. The plurality of first lights 24 is positioned on and evenly distributed between sleeves 26 of the jacket 12. In one embodiment, the plurality of first lights 24 comprises eight first lights 24. In another embodiment, each first light 24 comprises a plurality of first light emitting diodes 28. In yet another embodiment, the first lights 24 are configured to emit yellow light. In still yet another embodiment, the first lights 24 are configured to illuminate intermittently so that the first lights 24 flash.

Each of a pair of controllers 30 is positioned below an end 36 of a respective sleeve 26. The controller 30 is operationally coupled to the power module 14 and the first lights 24 that are positioned on the respective sleeve 26. Each controller 30 is configured to position proximate to a respective hand of the user. The controller 30 is positioned to selectively couple the first lights 24 that are positioned on the respective sleeve 26 to the power module 14 to indicate an intent of the user to execute a turn that corresponds to the respective sleeve 26.

In one embodiment, each controller 30 comprises a housing 32. A wire connector 34 is coupled to and extends between the housing 32 and the power module 14. The wire connector 34 extends from the end 36 of the respective sleeve 26 so that the housing 32 is positioned proximate to the respective hand of the user. A button 38 is coupled to the housing 32. The button 38 is configured to be depressed a first time to couple the first lights 24 that are positioned on the respective sleeve 26 to the power module 14 to indicate the intent of the user to execute the turn corresponding to the respective sleeve 26. The button also 38 is configured to be depressed a second time to decouple the first lights 24 that are positioned on the respective sleeve 26 from the power module 14. In another embodiment, the housing 32 is substantially ovally shaped.

A second light 40 is reversibly couplable to the jacket 12. The second light 40 is operationally couplable to the power module 14. The second light 40 is configured to render the user visible to others, such as emergency responders and drivers approaching a construction zone. In one embodiment, the second light 40 is positioned below the solar panel 18. In another embodiment, the second light 40 is white. In yet another embodiment, the second light 40 comprises a plurality of second light emitting diodes 42.

In use, the solar panel 18 is configured to absorb the solar radiation to generate the electrical current to recharge the at least one battery 16. The wire connector 34 is positioned to extend from the end 36 of the respective sleeve 26 so that the housing 32 is positioned proximate to the respective hand of the user. The button 38 is configured to be depressed the first time to couple the first lights 24 that are positioned on the respective sleeve 26 to the power module 14 to indicate the intent of the user to execute the turn corresponding to the respective sleeve 26. The button 38 also is configured to be depressed the second time to decouple the first lights 24 that are positioned on the respective sleeve 26 from the power module 14. The second light 40 is configured to render the user visible to others, such as the emergency responders and the drivers approaching the construction zone.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A rider's apparel assembly comprising:
    a jacket configured for positioning over a torso and arms of a user such that said jacket is coupled to the user;
    a power module coupled to said jacket, said power module comprising at least one battery, said at least one battery being rechargeable;
    a solar panel coupled to said jacket, said solar panel being operationally coupled to said at least one battery, wherein said solar panel is positioned on said jacket such that said solar panel is configured for absorbing solar radiation for generating an electrical current for recharging said at least one battery, said solar panel being positioned on a back of said jacket proximate to a collar of said jacket;
    a plurality of first lights coupled to said jacket, said plurality of first lights being positioned on and evenly distributed between sleeves of said jacket;
    a pair of controllers, each said controller being positioned below an end of a respective said sleeve, said controller being operationally coupled to said power module and said first lights positioned on said respective said sleeve, each said controller comprising
        a housing, said housing being substantially ovally shaped,
        a wire connector coupled to and extending between said housing and said power module, said wire connector extending from said end of said respective said sleeve such that said housing is positioned proximate to the respective hand of the user, and
        a button coupled to said housing, said button being configured for depressing a first time for coupling said first lights positioned on said respective said sleeve to said power module for indicating the intent of the user to execute the turn corresponding to said respective said sleeve, said button being configured for depressing a second time for decoupling said first lights positioned on said respective said sleeve from said power module;
    a second light reversibly couplable to said jacket, said second light being operationally couplable to said power module, said second light being positioned below said solar panel; and
    wherein each said controller is positioned on said jacket such that said controller is configured for positioning proximate to a respective hand of the user such that said controller is positioned for selectively coupling said first lights positioned on said respective said sleeve to said power module for indicating an intent of the user to execute a turn corresponding to said respective said sleeve, wherein said second light is positioned on said jacket such that said second light is configured for rendering the user visible to others, such as emergency responders and drivers approaching a construction zone.

2. The assembly of claim 1, further including said plurality of first lights comprising eight said first lights.

3. The assembly of claim 1, further including each said first light comprising a plurality of first light emitting diodes.

4. The assembly of claim 1, further including said first lights being configured for emitting yellow light.

5. The assembly of claim 1, further including said first lights being configured for intermittent illumination such that said first lights flash.

6. The assembly of claim 1, further including said second light being white.

7. The assembly of claim 1, further including said second light comprising a plurality of second light emitting diodes.

8. The assembly of claim 1, further including said jacket comprising porous fabric such that said jacket is permeable to air.

9. A rider's apparel assembly comprising:

a jacket configured for positioning over a torso and arms of a user such that said jacket is coupled to the user, said jacket comprising porous fabric such that said jacket is permeable to air;

a power module coupled to said jacket, said power module comprising at least one battery, said at least one battery being rechargeable;

a solar panel coupled to said jacket, said solar panel being operationally coupled to said at least one battery, wherein said solar panel is positioned on said jacket such that said solar panel is configured for absorbing solar radiation for generating an electrical current for recharging said at least one battery, said solar panel being positioned on a back of said jacket proximate to a collar of said jacket;

a plurality of first lights coupled to said jacket, said plurality of first lights being positioned on and evenly distributed between sleeves of said jacket, said plurality of first lights comprising eight said first lights, each said first light comprising a plurality of first light emitting diodes, said first lights being configured for emitting yellow light, said first lights being configured for intermittent illumination such that said first lights flash;

a pair of controllers, each said controller being positioned below an end of a respective said sleeve, said controller being operationally coupled to said power module and said first lights positioned on said respective said sleeve, wherein each said controller is positioned on said jacket such that said controller is configured for positioning proximate to a respective hand of the user such that said controller is positioned for selectively coupling said first lights positioned on said respective said sleeve to said power module for indicating an intent of the user to execute a turn corresponding to said respective said sleeve, each said controller comprising:
- a housing, said housing being substantially ovally shaped,
- a wire connector coupled to and extending between said housing and said power module, said wire connector extending from said end of said respective said sleeve such that said housing is positioned proximate to the respective hand of the user, and
- a button coupled to said housing, said button being configured for depressing a first time for coupling said first lights positioned on said respective said sleeve to said power module for indicating the intent of the user to execute the turn corresponding to said respective said sleeve, said button being configured for depressing a second time for decoupling said first lights positioned on said respective said sleeve from said power module;

a second light reversibly couplable to said jacket, said second light being operationally couplable to said power module, wherein said second light is positioned on said jacket such that said second light is configured for rendering the user visible to others, such as emergency responders and drivers approaching a construction zone, said second light being positioned below said solar panel, said second light being white, said second light comprising a plurality of second light emitting diodes;

wherein said solar panel is positioned on said jacket such that said solar panel is configured for absorbing the solar radiation for generating the electrical current for recharging said at least one battery, wherein said wire connector is positioned for extending from said end of said respective said sleeve such that said housing is positioned proximate to the respective hand of the user, wherein said button is configured for depressing the first time for coupling said first lights positioned on said respective said sleeve to said power module for indicating the intent of the user to execute the turn corresponding to said respective said sleeve and wherein said button is configured for depressing the second time for decoupling said first lights positioned on said respective said sleeve from said power module, wherein said second light is positioned on said jacket such that said second light is configured for rendering the user visible to others, such as the emergency responders and the drivers approaching the construction zone.

* * * * *